(12) United States Patent
Dresti et al.

(10) Patent No.: US 6,870,463 B2
(45) Date of Patent: Mar. 22, 2005

(54) REMOTE CONTROL DEVICE WITH APPLIANCE POWER AWARENESS

(75) Inventors: Mauro Dresti, West Covina, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 10/654,180

(22) Filed: Sep. 3, 2003

(65) Prior Publication Data

US 2004/0046677 A1 Mar. 11, 2004

Related U.S. Application Data

(63) Continuation of application No. 10/087,078, filed on Mar. 1, 2002, now Pat. No. 6,642,852.

(51) Int. Cl.[7] .............................................. H04Q 5/22
(52) U.S. Cl. ............................. 340/10.4; 340/825.69; 340/825.72; 307/38; 307/40
(58) Field of Search ........................ 340/10.4, 825.71, 340/825.72, 825.25, 310.01, 310.08; 370/38, 40

(56) References Cited

U.S. PATENT DOCUMENTS 6,496,927 B1 * 12/2002 McGrane et al. .............. 713/1

* cited by examiner

Primary Examiner—Brian Zimmerman
Assistant Examiner—Clara Yang
(74) Attorney, Agent, or Firm—Gary R. Jarosik

(57) ABSTRACT

A controlling device having programming which ensures an appliance will be placed into a desired power state. The controlling device transmits a query message to a power monitor associated with the appliance to obtain the current power state of the appliance. If the current power state corresponds to the desired power state, the controlling device inhibits the transmission of a command to the appliance to effect a change in the current power state of the appliance.

32 Claims, 14 Drawing Sheets

REMOTE CONTROL HARDWARE BLOCK DIAGRAM

REMOTE CONTROL "ALL ON" LOGIC

REMOTE CONTROL INDIVIDUAL "UNIT ON" LOGIC

RF POWER MONITOR MODULE LOGIC FLOW

REMOTE CONTROL DEVICE WITH APPLIANCE POWER AWARENESS

RELATED APPLICATION

This application claims the benefit of and is a continuation of U.S. application Ser. No. 10/087,078, filed Mar. 1, 2002, now U.S. Pat. No. 6,642,852, which is hereby incorporated by reference in its entirety.

BACKGROUND OF THE INVENTION

The present invention relates generally to home appliance control and, more particularly, to a remote control device with appliance power awareness.

In the art it is known to monitor power supplied to home appliances. For example, Niles currently markets a power sensor under the "APC-2" brand name. Similarly, Panja markets a power sensor under the "AMX" "PCS" and "PCS2" brand names. These power sensors are particularly used to monitor the state of a home appliance, i.e., whether the home appliance is powered on or in a standby mode of operation (also referred to as off). More particularly, the power sensors are used in connection with a system that further comprises a central controller. The power sensors communicate state information to the central controller, via a hard wired connection, and the central controller is programmable to use the state information to effect control of home appliances.

While these known systems work for their intended purpose, they have not been widely adopted for use by consumers for the reason that they suffer numerous drawbacks. In this regard, the systems are expensive to purchase and installation (e.g., wiring of the components) often requires the assistance of a professional. Programming the central controller also requires a high-level of programming skill that most consumers find intimidating or are simply unable to comprehend. For example, the Niles system central controller is programmable only by authorized dealers/installers. Thus, the need exists for a system and method for controlling appliances having a power awareness component that an average consumer can afford to purchase and can easily use.

For simply controlling the operation of home appliances, it is also known to provide a remote control with macro command capabilities. For example, commonly owned U.S. Pat. No. 5,959,751, which is incorporated herein by reference in its entirety, describes a method of programming a remote control to respond to activation of a macro key to cause the transmission of command codes that have been assigned to the macro key. Programming of a macro key can be accomplished by a consumer simply entering a macro setup mode, activating keys on the remote control in the same manner that the consumer would normally activate keys to cause one or more appliances to perform one or more operations, and exiting the macro setup mode. Macro keys can also be preprogrammed.

While remote controls having macro command capabilities have been widely accepted and used by consumers, there is a particular problem associated with the use of macros. When a macro is programmed to transmit power control commands to an appliance (e.g., a macro programmed to turn on a VCR, turn on a television, and tune the television to channel 3), there is no easy way to ensure that the appliance is in a known state when the macro is executed. Thus, there is no easy way to ensure that the desired operations will be performed when the macro is executed. In the example provided, if the television were already powered on prior to executing the macro, executing the macro might send a power toggle command to the television that would not have the desired effect of turning the television on. Rather, to the frustration of a user, the power toggle command in the executing macro would cause the already powered on television to turn off and the tune to channel 3 command would not be capable of being operated upon by the now powered off television.

To solve this problem, it is possible for users to program a macro which omits the transmission of power commands. This, however, defeats the purpose of providing a remote control with macro command capabilities as the user must then control power to an appliance by conventionally activating keys on the remote control or by manually turning on/off the appliances. Alternatively, in limited cases where another function command also causes an appliance to turn on (e.g., most Sony AV receivers will turn on if not already on when an input select command is received) a macro can be programmed using these function commands to place the appliance in a desired state. This solution is also not acceptable as it requires the user to have a knowledge of the intricacies of the operation of an appliance which is knowledge that most consumers fail to posses. Furthermore, even if the consumer had such knowledge of appliance operation, this solution requires that the appliance be placed in a state that might not be desired by the consumer thereby creating a further problem that needs to be addressed (e.g., by requiring the consumer to add further steps to a programmed macro). Accordingly, the need also exists for a system and method for controlling appliances that an average consumer can easily use and which will ensure that the desired operations will be performed.

SUMMARY OF THE INVENTION

In accordance with these needs a controlling device is provided having programming which ensures an appliance will be placed into a desired power state. To this end, the controlling device transmits a query message to a power monitor associated with the appliance to obtain the current power state of the appliance. If the current power state does not correspond to the desired power state, the controlling device transmits a command to the appliance to effect a change in the current power state of the appliance. In this regard, if the appliance is responsive to discrete power commands, the controlling device may transmit a discrete power command to effect the change in the current power state (i.e., turn the device on or turn off) in the case where the current power state does not match the desired power state. If the appliance is responsive to power toggle commands, the power toggle command appropriate for the appliance is transmitted to cause the appliance to change its current power state to the desired power state in the case where the current power state does not match the desired power state. If the current power state matches the desired power state, the controlling device inhibits the transmission of a command to the appliance to effect a change in the current power state of the appliance.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
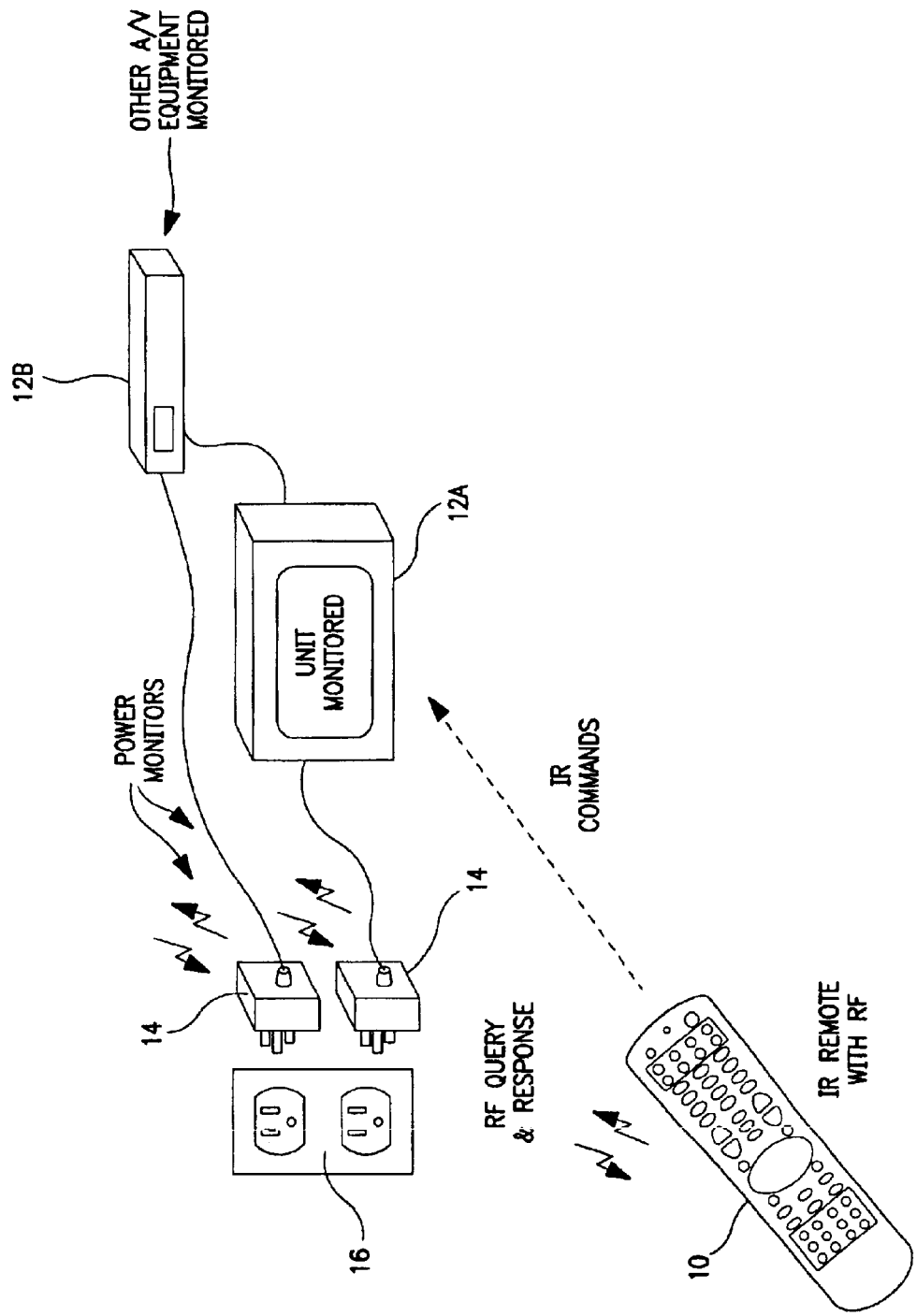
FIG. 1 illustrates an exemplary system for providing a remote control with appliance power awareness.

Turning now to the figures, wherein like reference numerals refer to like elements, there is illustrated in FIG. 1 a system for providing a remote control with appliance power awareness. Generally, the system includes a remote control 10 capable of commanding the operation of home appliances 12, such as television 12a and set-top box 12b. It will be appreciated that the home appliances 12 can be of different types (such as, by way of example only, televisions, VCRs, DVD players, set-top boxes, amplifiers, CD players, game consoles, home lighting, drapery, etc.) manufactured by different manufacturers. The home appliances 12 receive power from an electrical outlet 16 using an intermediate power monitor unit 14 having a socket for receiving the plug of an appliance 12 and a plug for insertion into a socket of the electrical outlet 16. As will be described in greater detail, the power monitor unit 14 bi-directionally communicates with the remote control 10 to provide the remote control 10 with awareness of the power state of a home appliance 12. In this manner, the remote control 10 can consider the power state of the home appliances when executing a macro or other commands.

Figure 2:
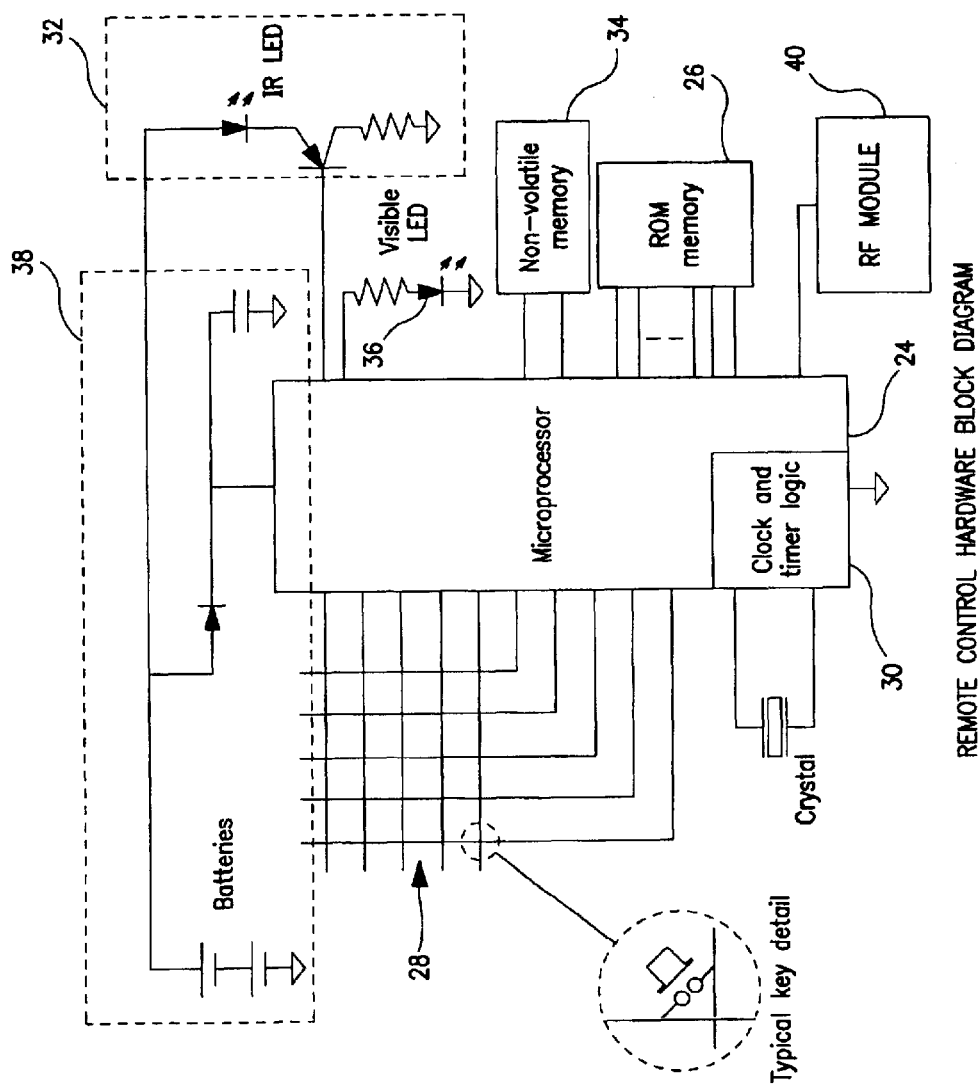
FIG. 2 illustrates a block diagram schematic of an exemplary remote control of the system of FIG. 1.

For communicating with the consumer appliances 12 as well as the power monitor units 14, the remote control 10 preferably includes a processor 24 coupled to a ROM memory 26, a key matrix 28 (in the form of physical buttons, a touch screen, or the like), an internal clock and timer 30, an IR (or RF) transmission circuit 32 (for sending signals to a home appliance 12), an RF (or IR) bi-directional communications module 40 (for sending and receiving signals from a power monitor unit 14), a non-volatile read/write memory 34, a visible LED 36 (to provide visual feedback to the user of the remote control 20), and a power supply 38 as illustrated in FIG. 2. As will be appreciated, the transmission circuit 32 and communications module 40 perform operations that could be performed by a single device. Accordingly, the transmission circuit 32 and communications module 40 need not be separate and distinct components.

The ROM memory 26 includes executable instructions that are intended to be executed by the processor 24 to control the operation of the remote control 10. In this manner, the processor 24 may be programmed to control the various electronic components within the remote control 10, e.g., to monitor the power supply 38, to cause the transmission of signals, etc. Meanwhile, the non-volatile read/write memory 34, for example an EEPROM, battery-backed up RAM, Smart Card, memory stick, or the like, is provided to store user entered setup data and parameters as necessary. While the memory 26 is illustrated and described as a ROM memory, memory 26 can be comprised of any type of readable media, such as ROM, RAM, SRAM, FLASH, EEPROM, or the like. Preferably, the memory 26 is non-volatile or battery-backed such that data is not required to be reloaded after battery changes. In addition, the memories 26 and 34 may take the form of a chip, a hard disk, a magnetic disk, and/or an optical disk.

For commanding the operation of home appliances of different makes, models, and types, the memory 26 also includes a command code library. The command code library is comprised of a plurality of command codes that may be transmitted from the remote control 10 for the purpose of controlling the operation of the home appliances 12. The memory 26 also includes instructions which the processor 24 uses in connection with the transmission circuit 32 to cause the command codes to be transmitted in a format recognized by the target home appliance 12. Similarly, the memory 26 also includes instructions which the processor 24 uses in connection with the communications module 40 to cause communications to be transmitted in a format recognized by the power monitor units 14.

To identify home appliances 12 by type and make (and sometimes model) such that the remote control 10 is adapted to transmit recognizable command codes in the format appropriate for such identified home appliances 12, data may be entered into the remote control 10. Since methods for setting up a remote control to control the operation of specific home appliances is well-known, it will not be described in greater detail herein. Nevertheless, for additional information pertaining to remote control setup, the reader may turn to U.S. Pat. Nos. 5,614,906 and 4,959,810 which are incorporated herein by reference in their entirety.

To cause the remote control 10 to perform an action, the remote control 10 is adapted to be responsive to events, such as a sensed user interaction with one or more keys on the key matrix 28. More specifically, in response to an event appropriate instructions within the memory 26 are executed. For example, when a command key is activated on the remote control 10, the remote control 10 may read the command code corresponding to the activated command key from memory 26 and transmit the command code to a home appliance 12 in a format recognizable by the home appliance 12. It will be appreciated that the instructions within the memory 26 can be used not only to cause the transmission of command codes to home appliances 12 but also to perform local operations. While not limiting, local operations that may be performed by the remote control 10 include favorite channel setup, macro button setup, command function key relocation, etc. Since examples of local operations can be found in U.S. Pat. Nos. 5,481,256, 5,959,751, 6,014,092, which are incorporated herein by reference in their entirety, they will not be discussed in greater detail herein.

Figure 3:
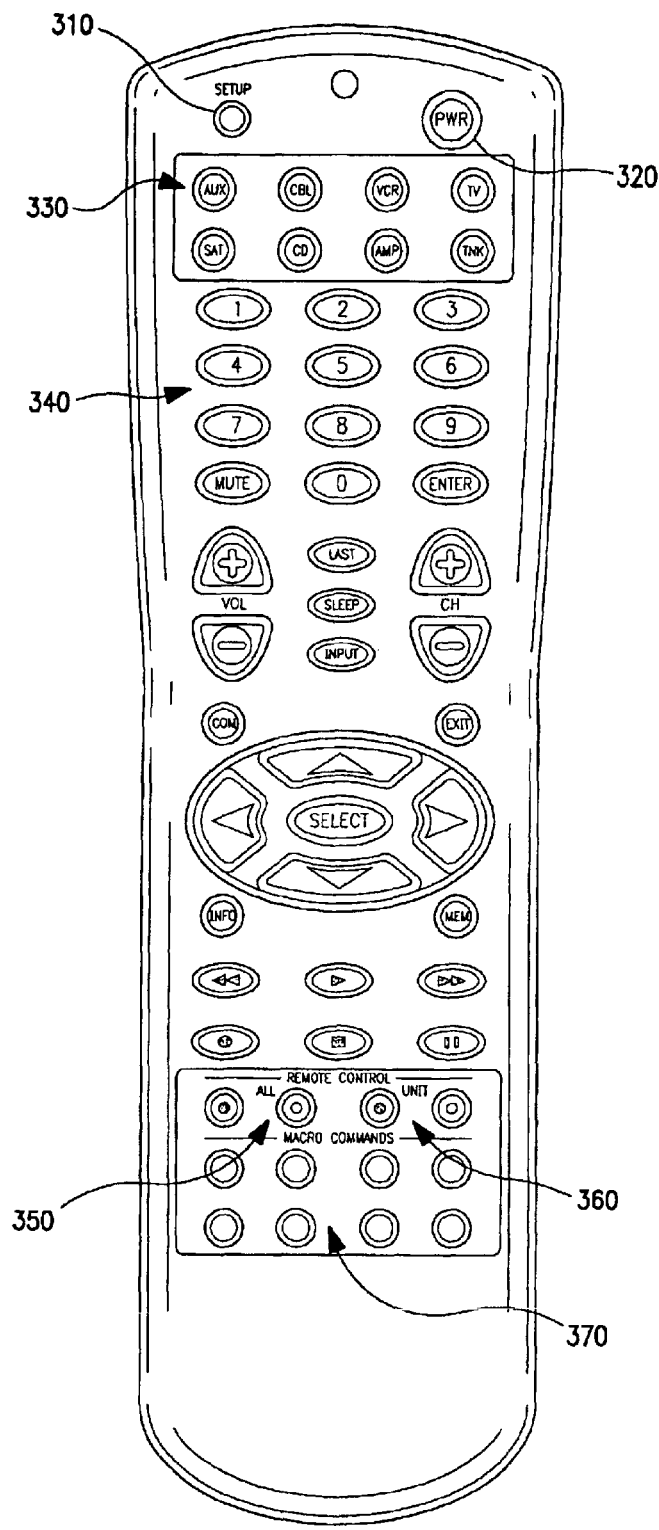
FIG. 3 illustrates a top view of the remote control of the system of FIG. 1.

By way of further example, an exemplary remote control 10 is illustrated in FIG. 3. While illustrated as a conventional hand-held remote control, the remote control can include other devices such as PDAs, personal computers, or the like. Accordingly, the description that follows need not be limiting. As illustrated, the remote control 10 includes a "Setup" key 310, a "Power" key 320, "Device" keys 330 (for selecting the mode of operation—i.e., the home appliance/device to control), "Numeric" keys 340 (corresponding to the digits 0–9), and a group of "Macro" keys 370 to which pre-programmed or user programmable macros can be assigned. Additional, optional keys may include a pair of keys 350 to command "All On" or "All Off" operations and/or a pair of keys 360 to command "On" and "Off" operations for a currently selected device. The operation of the special keys 350 and 360, which comprise a smart power feature, will be described in greater detail in the paragraphs that follow. The remaining keys illustrated in FIG. 3 perform conventional remote control functions that will be well understood by those of ordinary skill in the art.

Figure 9:
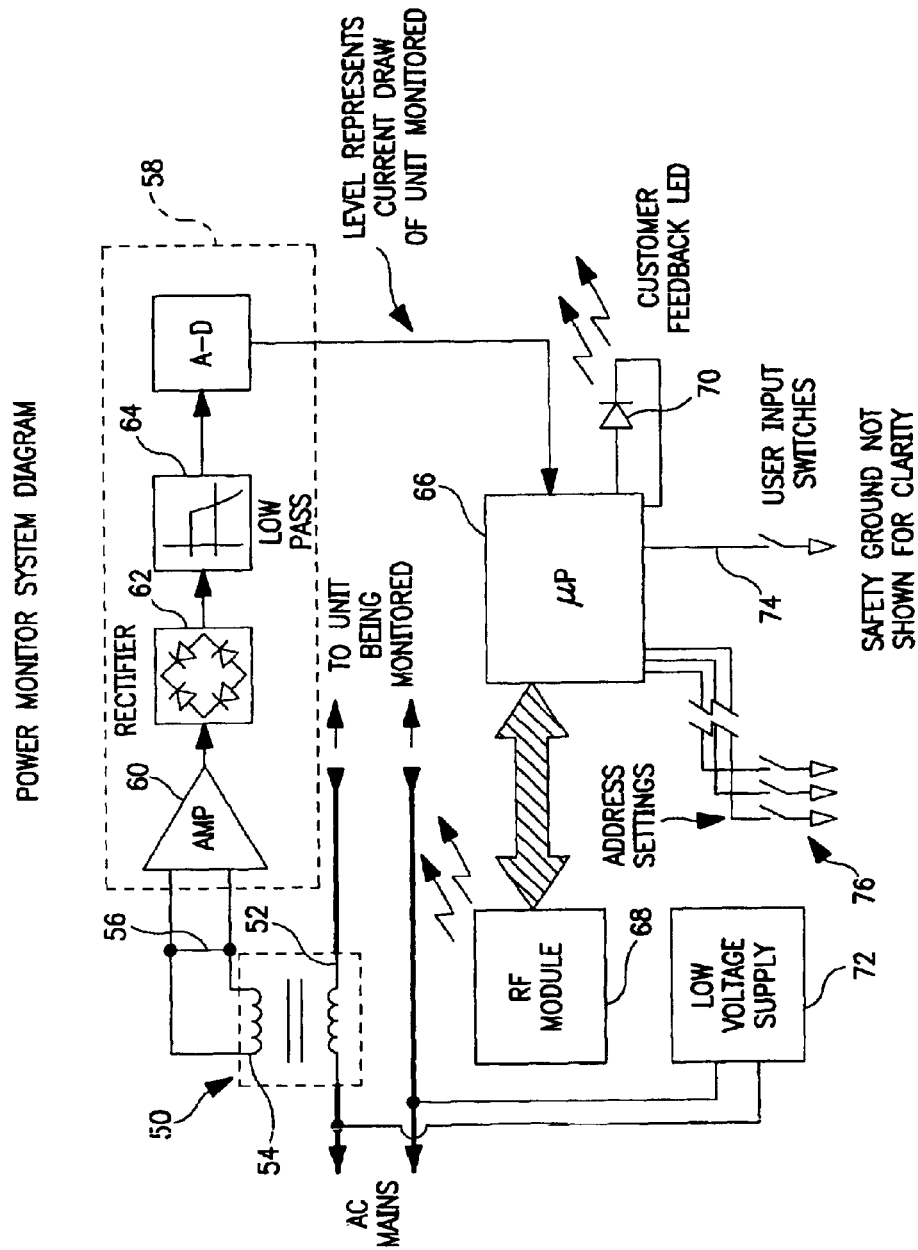
FIG. 9 illustrates a block diagram schematic of an exemplary power monitoring unit of the system of FIG. 1.

For monitoring power supplied to a home appliance 12 and, accordingly, the state of the home appliance 12 (e.g., powered on or off/in standby mode), the power monitoring unit 12 includes a current sensing device 50 as illustrated in FIG. 9. The current sensing device 50 may be in the form of a transformer having a primary winding 52 which is inserted in the path of current flow going from the outlet 16 to the home appliance 12. In this manner, the transformer secondary winding 54 will thus have a current flow which is representative of the current flow passing through the transformer primary winding 52. In the illustrated current sensing device 50, a dropping resistor 56 is inserted as a load to covert the secondary winding 54 current to a voltage. It will be appreciated that other current sensing devices 50 for generating a signal representative of the current being drawn by the home appliance 12 may be used such as, by way of example only, any Hall Effect device.

Figure 10:
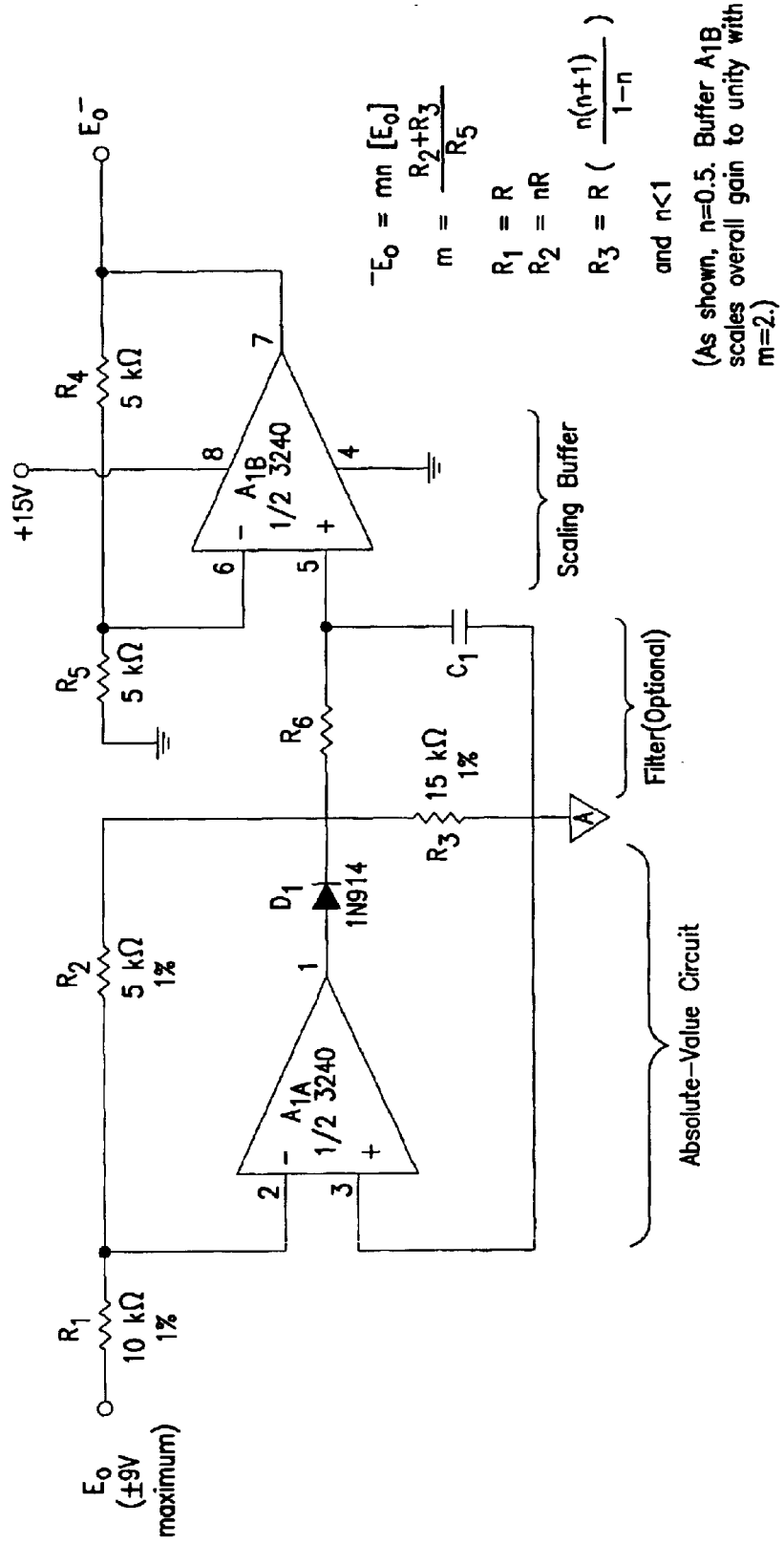
FIG. 10 illustrates a schematic of an exemplary power monitoring module of the power monitoring unit of FIG. 9.

For conditioning the signal generated by the current sensing device 50, the power monitor unit 14 may also be provided with a signal conditioning circuit 56. For example, the voltage drop across the resistor 56 can be sent though a signal conditioning circuit 56 comprised of an amplifier-rectifier 60/62 and a low-pass filter 64. In this manner, the AC voltage representation of the AC load current can be transformed to a DC voltage signal which can be interfaced to a processor 66 through an Analog-Digital (A/D) converter or Voltage to Frequency Oscillator (VFO). Further examples of such circuitry can be seen in "analog-digital CONVERSION HANDBOOK," Copyright 1972 & 1976 by Analog Devices, Inc.; Second Edition, June, 1976 and "IC Op-Amp Cookbook," by Walter G. Jung; 1974, 1980, and 1986 by Howard W. Sams & Co., A Division of Macmillan, Inc.; Third Edition Fourth Printing, 1988. pp. 252 and 253, which are incorporated herein by reference in their entirety. The amplifier, rectifier and low pass filter are shown in greater detail in FIG. 10.

For powering the components of the power monitor unit 14, a voltage supply 72 is provided. By way of example, the voltage supply 72 can be circuitry that converts the AC voltage from the outlet 16 to a voltage level that can directly power the components of the power monitor unit 14. Alternatively, the voltage supply 72 can be batteries. Still further, the power monitor unit 14 may include a small non-volatile memory (such as an EEPROM) to maintain setting through power failures, brown outs, etc.

The processor 66 has associated instructions for accepting the DC signal supplied from the conditioning circuit 58 and for performing operations based on the value of the signal. The processor 66 also has associated instructions which the processor 66 uses in connection with an RF (or IR) module to cause communications to be transmitted in a format recognized by the remote control 10. In this regard, RF transmissions can be made using a custom-designed protocol operating in one of the frequency bands allocated by national regulatory agencies for use in control and status monitoring, or alternatively by a standardized conventional protocol such as Bluetooth, etc., using off-the-shelf components. The construction and operation of such RF transceivers is well know in the art. Instructions may also be provided for allowing the power monitor unit 14 to provide status information to a consumer by means of, for example, one or more LEDs 70, a display, etc. Once the power monitor unit is initialized, the power monitor unit enters a loop wherein it continually searches for one of at least two events, namely, activation of a user setup switch or receipt of a status enquiry message from the remote control 10.

Figure 11:
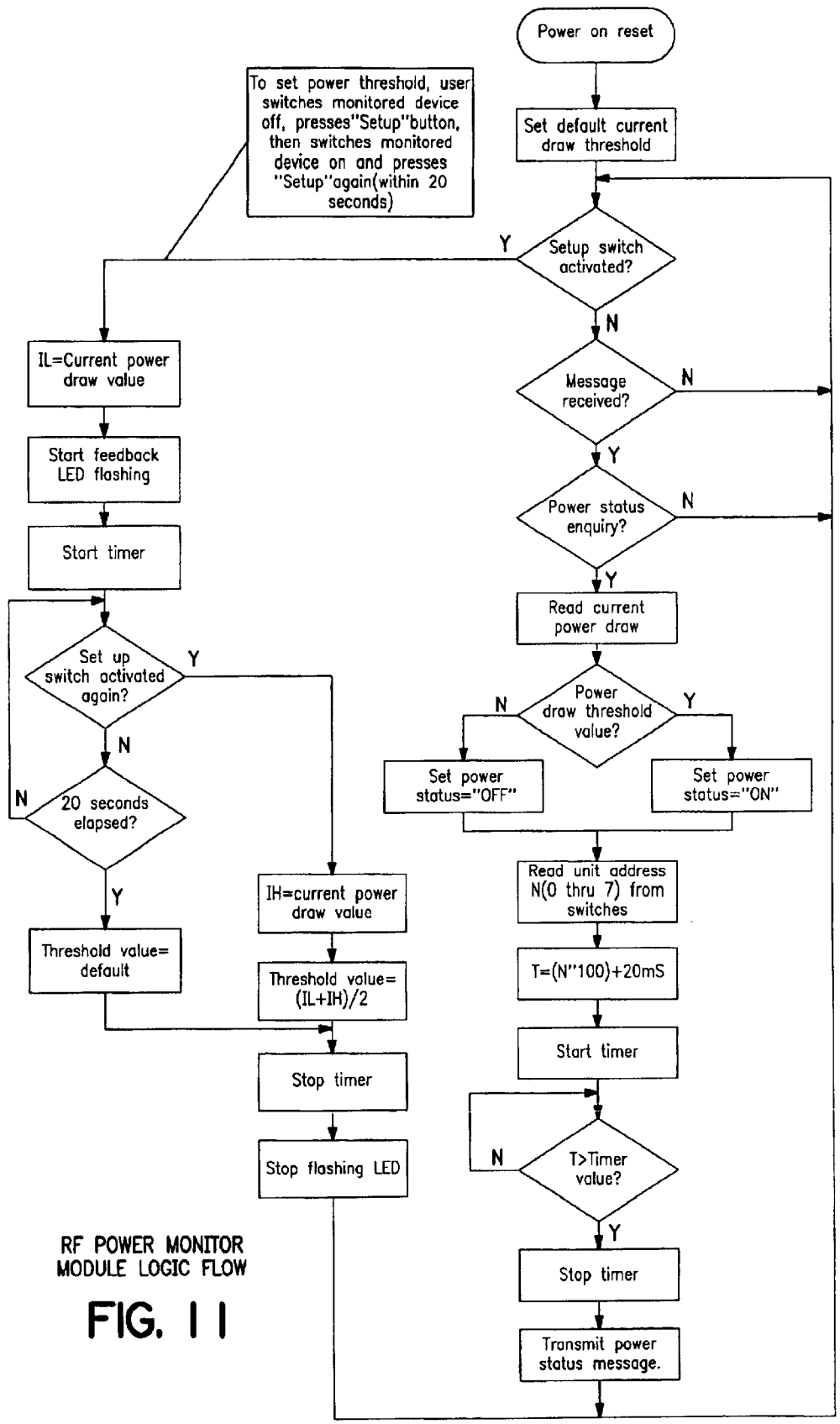
FIG. 11 illustrates an exemplary method for setting up a power monitoring unit of FIG. 9 and for providing power state information to the remote control of the system of FIG. 1.

To configure the power monitor unit 14 for use in the system, illustrated in FIG. 11, the power monitor unit 14 is set to recognize the "standby/off" and "on" load currents for the home appliance 12 associated with the power monitor unit 14. To this end, a consumer would place the appliance 12 to be monitored in the standby state and instruct the power monitor unit 14 to capture a signal representative of the current flow of the home appliance 12 in this standby state. The instruction to capture a signal representative of the standby current flow of the home appliance 12 can be entered by activation of a setup switch 74. In response to this instruction, the processor 66 monitors the DC voltage signal from the conditioning circuitry 58 and stores this voltage signal as the representation of the standby current flow.

To setup the power monitor unit 14 to recognize the appliance on current flow, a consumer would place the appliance 12 to be monitored in the on state and instruct the power monitor unit 14 to capture a representation of the resulting current flow. The instruction to capture a representation of the on current flow can be entered by, for example, a second activation of the setup switch 74. In response to this instruction, the processor 66 monitors the DC voltage signal from the conditioning circuitry 58 and stores this voltage signal as the representation of the on current flow. A threshold value may then be determined as the average of the on and off current flow representation values. It will be appreciated that these setup procedures can be timed to prevent the power monitor unit 14 from being locked in the setup mode of operation. It will be further appreciated that the setup procedure can be performed by the power monitor unit prompting the user to place the appliance in a given state and automatically monitoring the resulting current flow.

For use in establishing an address for the power monitor unit 14, which address is used to facilitate communications with the remote control 10, address setting device 76 is provided and accessible by the processor 66. The address setting device 76 may include dip switches, jumpers, means for keying in an address, or the like. In the case of dip switches or jumpers, the address setting device would be used to set a bit pattern that would serve as the address (e.g., three switches would allow the power monitor 14 to be set to one of eight unique addresses). Preferably, the address setting device 76 is accessible to the consumer although the address setting device can be factory preset. Additionally, extra switches 76 may be provided in cases where it is desired to set a unique system address to allow multiple remote controllers 10 to operate independently in the same vicinity.

Figure 4:
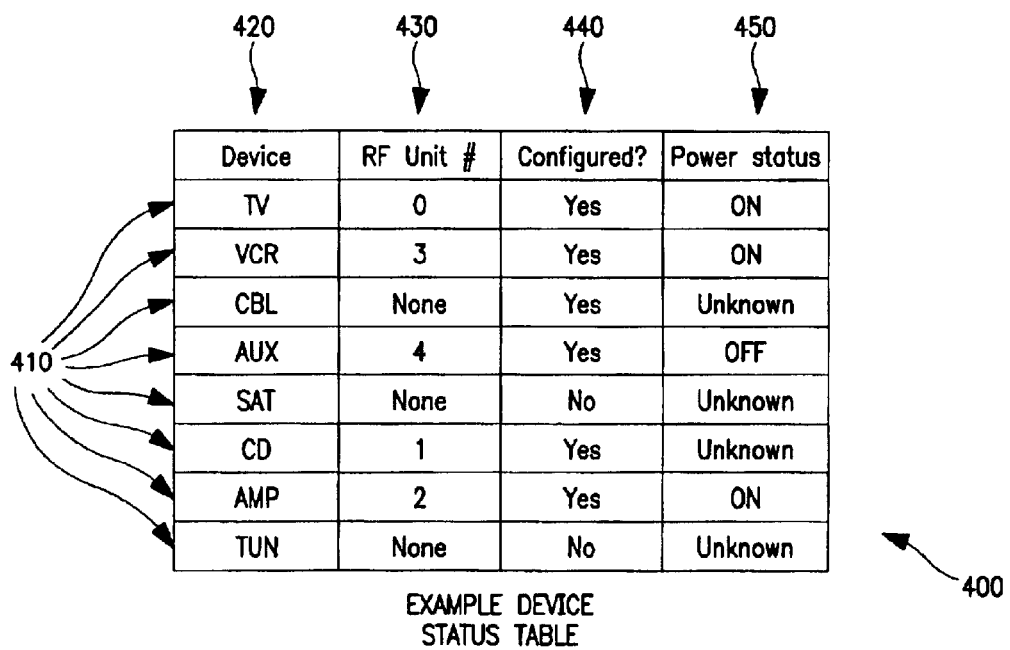
FIG. 4 illustrates an exemplary table in which power state information is maintained by the remote control of the system illustrated in FIG. 1.

During the operation of the system, the power monitor units 14 are used to provide the remote control 10 with awareness of the current power state (i.e., on or off) of the one or more home appliances 12 the remote control 10 is setup to control. The remote control 10 may maintain the current power state of the home appliances 12 in a table 400, illustrated in FIG. 4, for further use in a manner to be described hereinafter. As illustrated in FIG. 4, the table 400 may maintain data for each device mode supported by the remote control 10. In the exemplary case, since the illustrated remote control includes eight device mode keys 330 the table 400 has eight data field rows 410. For each device mode 420 data may be maintained that is indicative of: 1) an ID (430) assigned to the power monitor 14 associated with the device 12 to be controlled in the given device mode; 2) a status of the device setup (440) within the remote control for the given device mode; and 3) a power status (450) for the device 12 as reported by its associated power monitor unit 14.

More specifically, the data field (430) maintains the unit address number that corresponds to the user-set address of the power monitor unit 14 associated with the device to be controlled in the given device mode. For example, in the illustrative table of FIG. 4, the remote control has been setup to control an appliance in the VCR device mode which has been indicated to be plugged into a power monitor unit 14 having an address of "3" and to control an appliance in the TV device mode which has been indicated to be plugged into a power monitor unit 14 having an address of "0." It is to be understood that not all of the appliances 12 that the remote control 10 may control need a power monitor unit 14 and, in the case where an appliance in a given device mode is indicated to be operating without a power monitor unit 14, the table 400 would maintain an entry of "none." Preferably the table 400 is initialized when the remote control is first placed in service such that "none" is maintained in the data field 430 for each device mode 420 until such time as the device mode is, in fact, setup to indicate an address for a power monitor unit.

Figure 5:
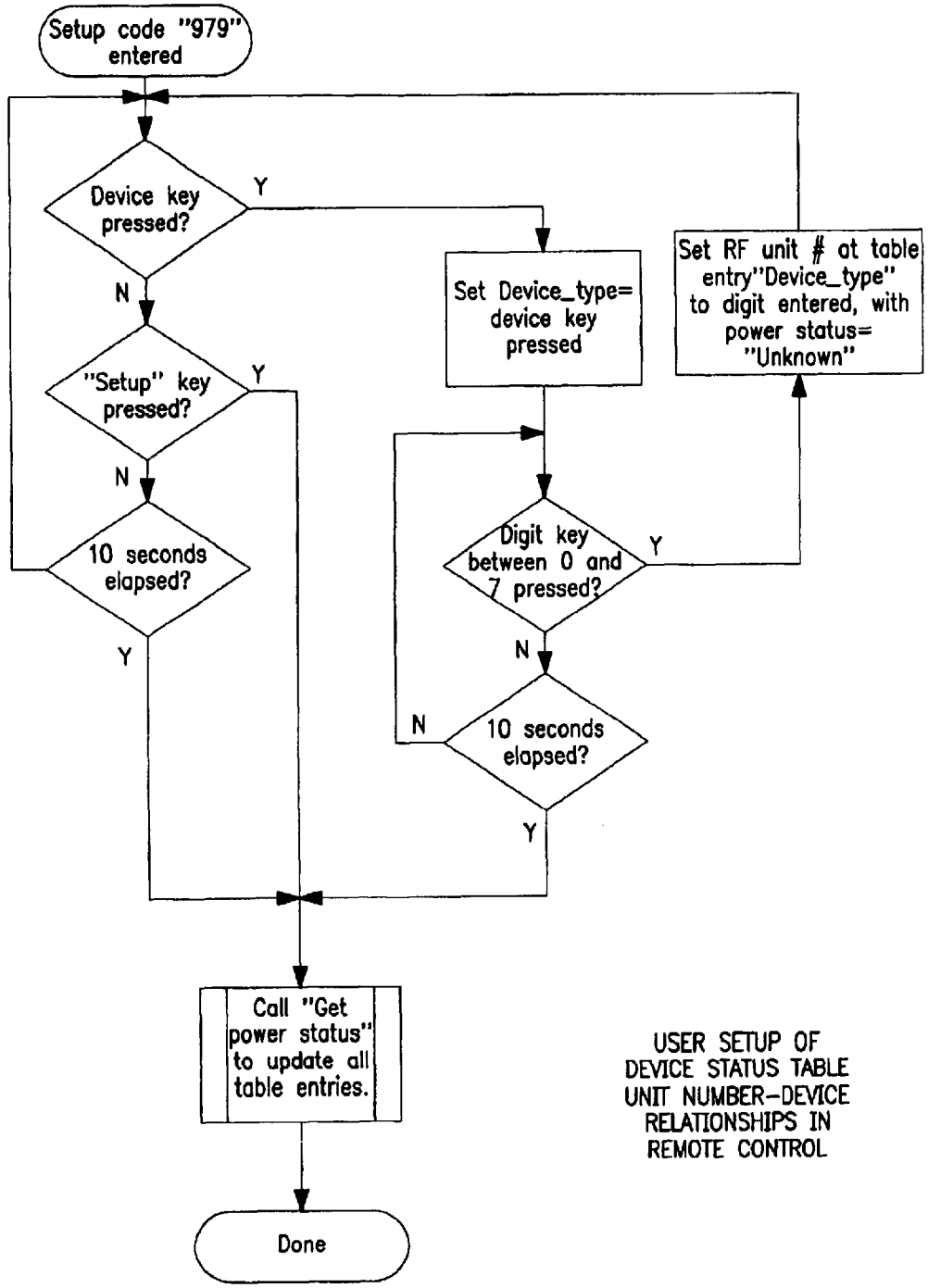
FIG. 5 illustrates an exemplary method for setting up the table of FIG. 4 to enable the remote control of the system of FIG. 1 to receive power state information.

To set the data in the ID data field 430 for a device mode 420, the user may perform the method generally illustrated in FIG. 5. By way of example, a user might enter a general setup mode (e.g., by activating the "Setup" key 310) followed by an indication to the remote control that the user specifically desires to setup the power module unit ID field of the table 400 (e.g., by entering a predetermined key sequence using the numeric keys 340, such as "979"). At this time the user may indicate to the remote control 10 the device mode of interest and the ID number of the power monitor unit associated with the appliance to be controlled in the given device mode (e.g., by hitting the appropriate "Device" key 330 and by hitting the numeric key 340 indicative of the address of the associated power monitor unit). The user could then indicate a desire to exit the setup mode (e.g., by again hitting the "Setup" key 310) at which time the indicated ID number would be stored in the data field 430 for the indicated device 420. This process can be repeated as often as needed to define the ID number of the power monitor unit for each device mode. This procedure may also be timed to prevent the remote control 10 from being locked in a setup mode. By way of an illustrative example, to setup the remote control such that the table 400 illustrated in FIG. 4 results, the user might hit the "Setup" key, enter the setup code "979," and active the following keys: TV-0-AMP-2-VCR-3-CD-1-AUX-4. The setup mode would be exited by again hitting the "Setup" key.

Further maintained with the table 400 in data field 440 is data indicative of whether an appliance to be controlled in a given device mode has, in fact, been setup by a user. Setup in this context is with reference to the initial input by the user to identify the specific brand/model of home appliance to be controlled when the corresponding "Device" button 330 is activated (See for example U.S. Pat. Nos. 5,614,906 and 4,959,810). If no device setup has been performed for a given device mode the data field 440 for that device maintains data indicative of this fact, e.g., it maintains data representative of a state "No." Preferably, upon initialization of the remote control 10, all of the data fields 440 are provided with a default value of "No" until such time as the device mode is setup. When a data field 440 indicates that a device mode has not been setup it may be assumed that the user does not have a home appliance to be controlled in this device mode and, as such, this device mode can be skipped during processing of an "All On" or "All Off" command which is described hereinafter.

A still further data field 450 within the data table 400 holds the current power status (i.e., "on" or "off") of a device as reported by its associated power monitor unit 14. If a device is not equipped with a power monitor unit 14 (i.e., the ID data field 430 has data indicative of "none") the data field 450 preferably maintains data indicating the appliance is in an "unknown" state. Likewise, if communications with the associated power monitor 14 have failed, the data field 450 again maintains data indicative of an "unknown" state.

Figure 6:
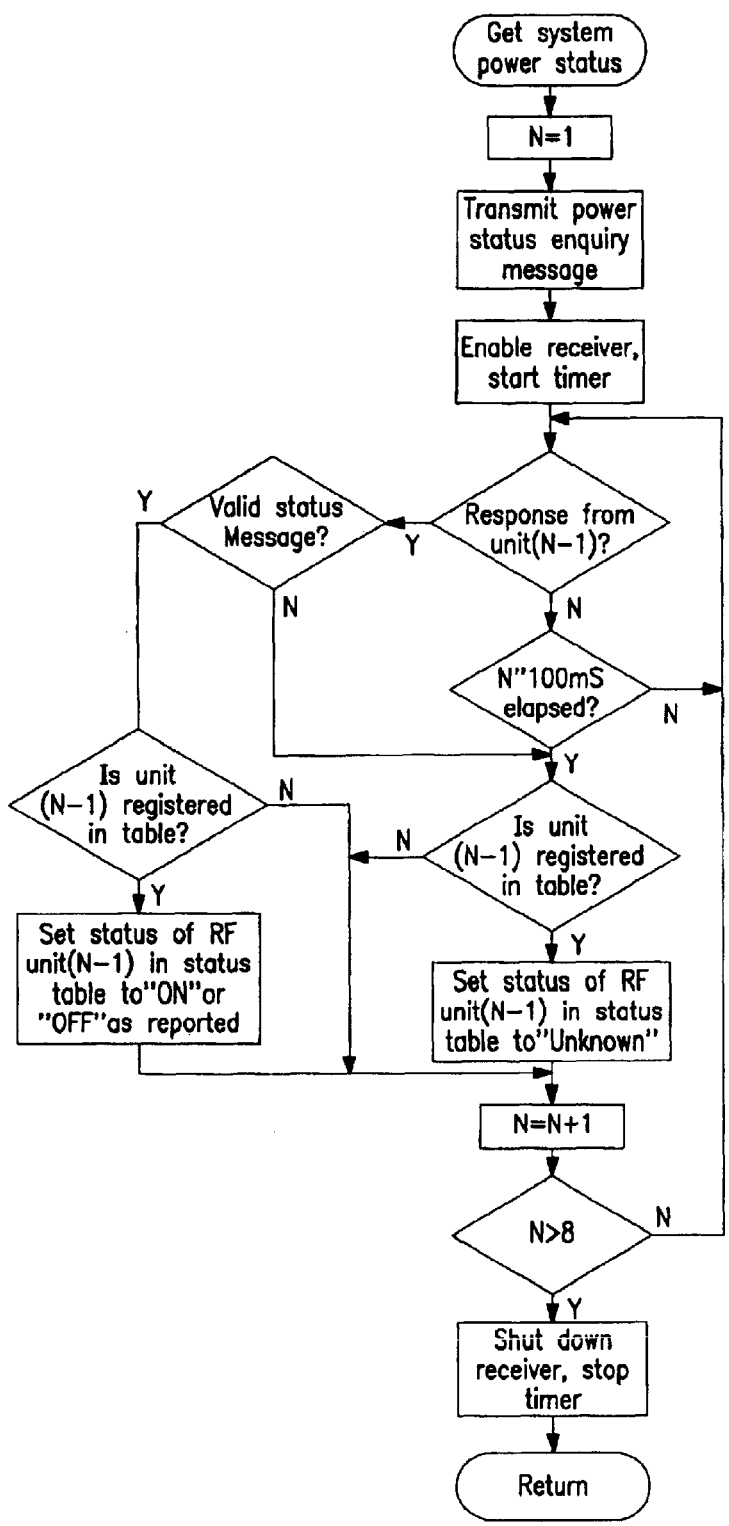
FIG. 6 illustrates an exemplary method for executing an update of the power state information table of FIG. 4.

To poll the one or more power monitor units 14 to gather the current power status, the remote control 10 issues a broadcast status enquiry message, as illustrated in FIG. 6, via its RF module 40. The power module units 14 respond to the status enquiry message by transmitting a status response message having data indicative of the status of the device associated with the respective power monitor unit 14. Preferably the status response messages from the one or more power monitor units 14 are transmitted in an orderly fashion to avoid collisions at the remote control 10. Upon receiving a status response message from a power monitor unit 14, received via the RF module 40, the remote control 10 strips the data from the status response message (i.e., the address of the responding power monitor unit 14 and the state of the device 12 associated with that power monitor unit 14) and updates the appropriate status data field 450 in the data table 400 to reflect the received status information. In the case where no response is received from a power monitor unit 14 or an invalid/untimely response is received, the power status of the data field corresponding to the missing or failed power monitor unit 14 is preferably set to "unknown."

In responding to the status enquiry message received at the power monitor unit 14, the power monitor unit 14 measures the power draw of its associated home appliance as illustrated in FIG. 11. The measured power draw is then compared to the previously established threshold value. If the measured power draw is above the established threshold value, the status of the home appliance 12 is determined to be "on." If, however, the measured power draw is not above the established threshold value, the status of the home appliance 12 is determined to be "off."

The determined status is returned to the remote control 10 as data in the status reply message. The status reply message also includes data that functions to identify the power monitor unit 14 transmitting the status reply message. Preferably this data is the address of the power monitor unit 14 which the power monitor unit 14 retrieves by reading the switches 76.

Figure 12:
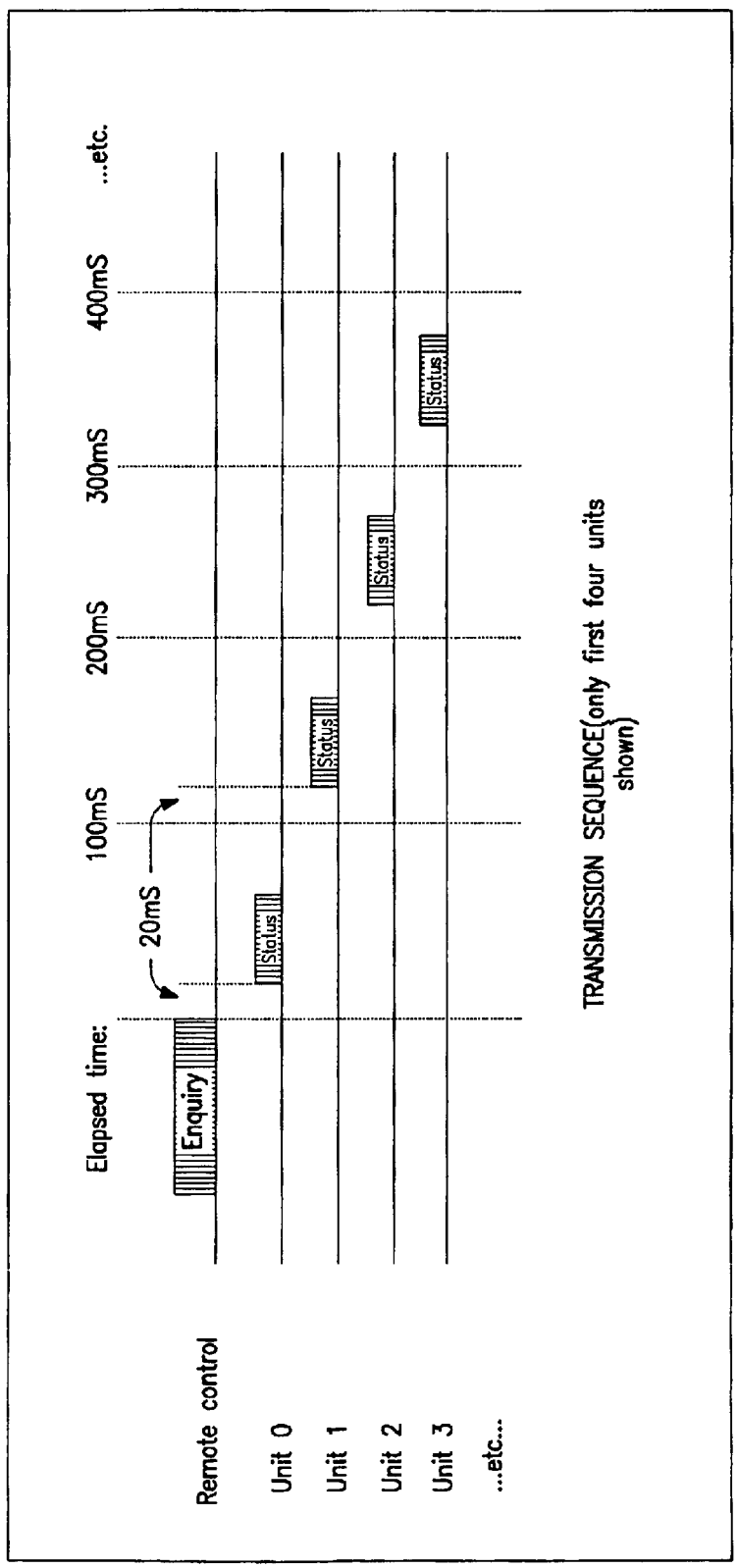
FIG. 12 illustrates an exemplary transmission sequence between the power monitoring units and the remote control of the system of FIG. 1.

To prevent the collision of status reply messages at the remote control 10, each power monitor unit 14 may wait an unique time period before transmitting its reply message. By way of example, a power monitor unit 14 may wait a time equal to 20 milliseconds plus 100 milliseconds times its address number before transmitting the reply message. Using a pre-transmit delay based on the unit address number in this manner results in each monitor 14 transmitting its status response in a sequential, predetermined manner (starting with unit 0 and ending with unit 7) as illustrated in FIG. 12. This further provides an additional level of error checking capability to the receiving remote control since each monitor unit 14 has a predetermined time window during which the remote control may expect to receive a reply transmission. Accordingly, receipt of a message outside of this time window would be indicative of an error condition resulting in the indication of an "unknown" state in the table 400 for the device associated with the power monitor unit 14 that is late with its transmission.

Figure 7:
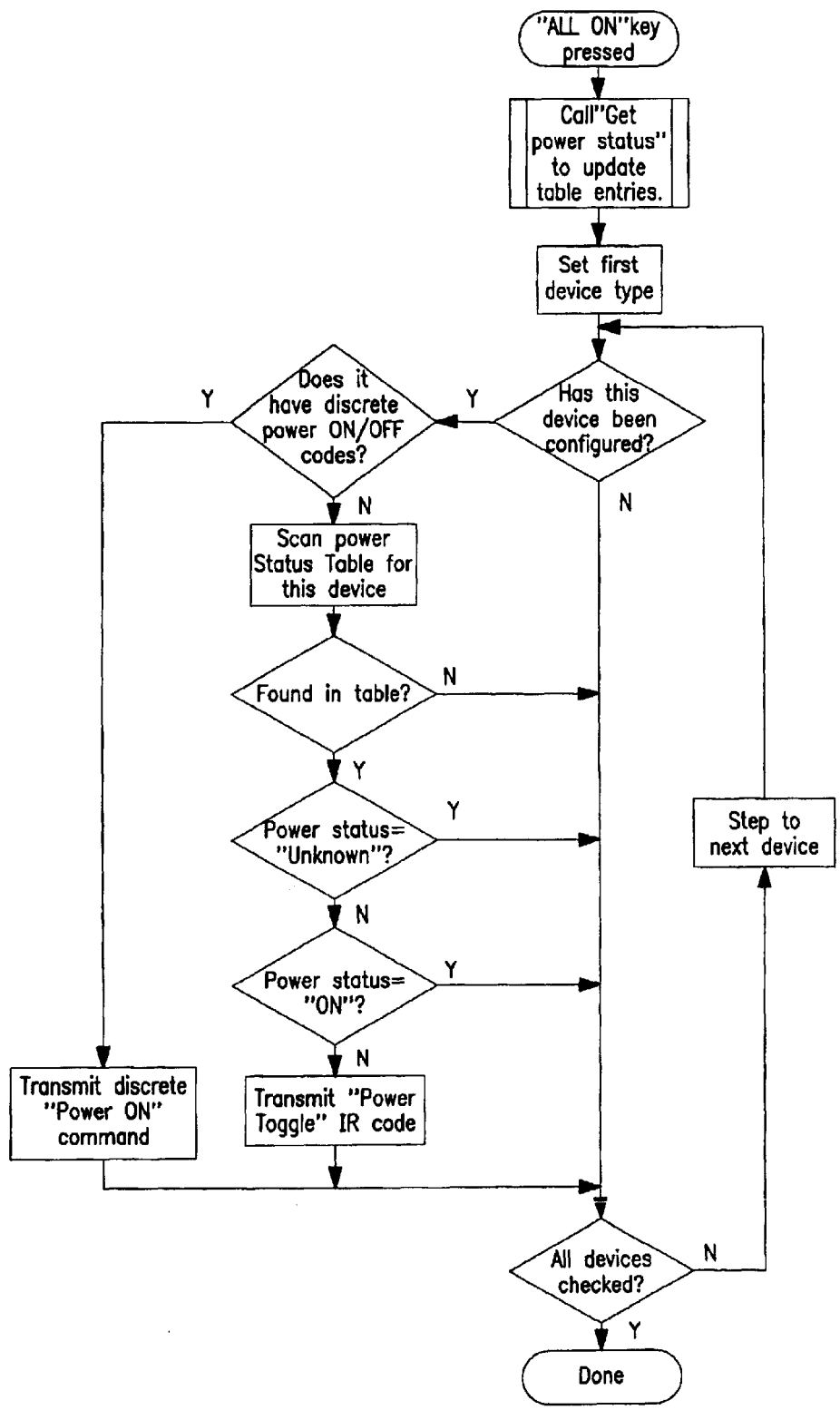
FIG. 7 illustrates an exemplary method for commanding multiple appliances within the system of FIG. 1 to be turned to the on state.

The polling of the power monitor units 14 may be initiated in response to the user activating one of the special power keys, one of the macro keys, in response to activation of a given setup mode, at timed intervals, etc. without limitation For example, when the "All On" key is activated, the remote control transmits the status enquiry message and retrieves the power status of the devices from the power monitor units 14 as described above. Once the table 400 has been updated with the status of the devices, as illustrated in FIG. 7, the remote control 10 performs processing to command each device that has been identified to the remote control (i.e., setup) and which has a functioning power monitor unit 14 (i.e., a power status monitor address was setup in the remote control and the power status monitor has reported a current status) to enter the "On" state. In this regard, the transmission of the appropriate command signals to the appliances 12 (if necessary) may be performed in a sequential order following the order in which the devices are maintained within the table 400. Within this sequential order, if a device mode has not been setup by the user (indicated by a "no" in the data field 440 for that device) this device mode will be skipped during the procedure.

More specifically, to initiate an "All On" procedure, for each device mode that has been setup, it is determined if a specific device supports explicit "On" and "Off" commands. This is determined by reference the command code library for the specified device using conventional look-up techniques. If the device supports these explicit commands, the remote control 10 merely transmits the explicit "On" command for that device to place the device in the "On" state and the procedure continues with the next device (if any).

If the device does not support explicit commands (i.e., it supports a power toggle command), the current status of the device is retrieved from the power status field 450 of the data table 400. If the status is indicated to be "Unknown" or "On," no further processing for this device is performed and the procedure moves to the next device (if any). If, however, the status is indicated to be "Off" in the power status field 450, the power toggle command for that device is transmitted for the purpose of causing the device to enter the "On" state. In this manner, activation of the "All On" key avoids the inadvertent placing of a home appliance in an unwanted "Off" state.

In a similar fashion, activation of the "All Off" key avoids the inadvertent placing of a home appliance in an unwanted "On" state. In this regard, activation of the "All Off" key causes the transmission of an explicit "Off" command, the transmission of a power toggle command, or no action in accordance with the logic set forth above with respect to the "All On" procedure.

Figure 8:
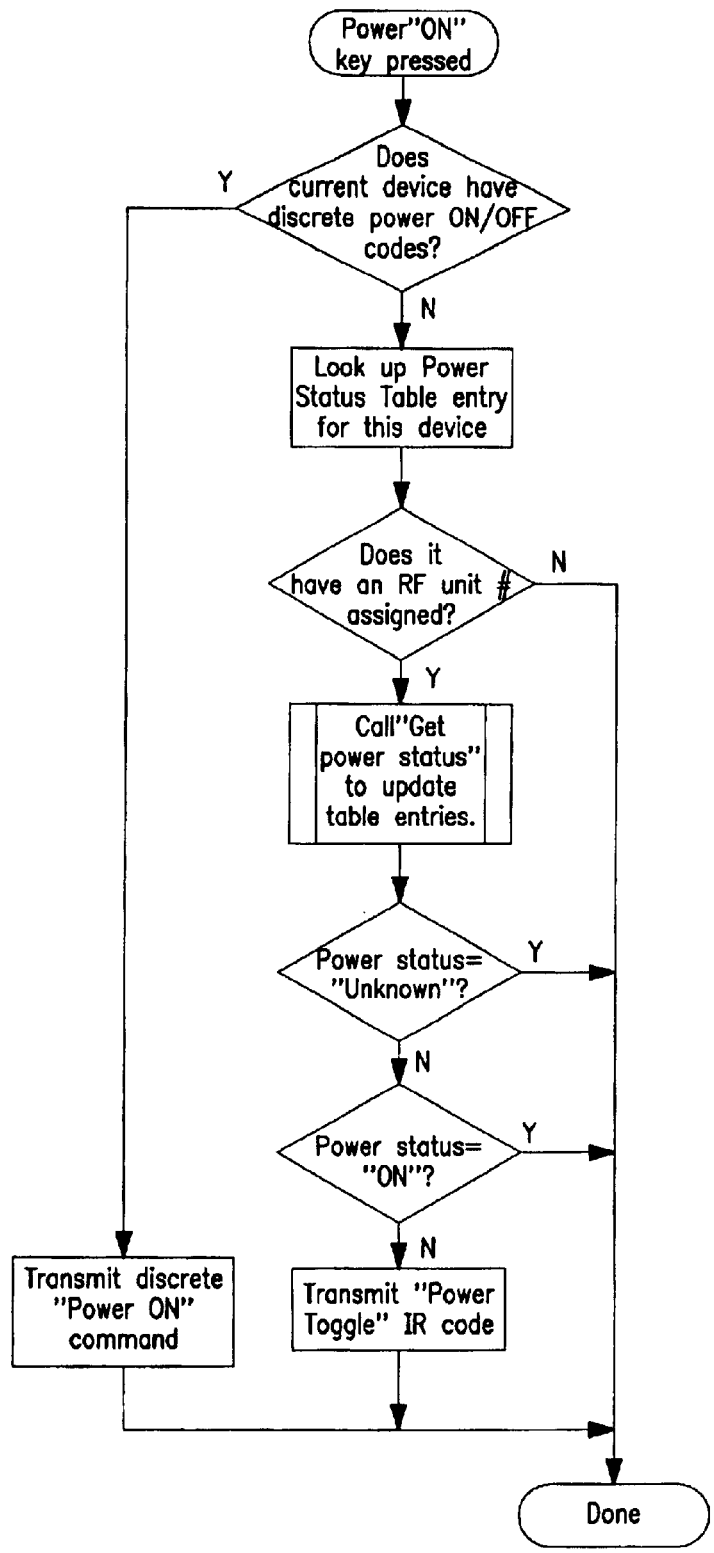
FIG. 8 illustrates an exemplary method for commanding single appliances within the system of FIG. 1 to be turned to the on state.

Still further, the table 400 can be updated and the data contained therein considered in the performance of the steps assigned to a programmed Macro key or in response to activation of the single unit power keys 360. Again, a transmission of a status enquiry message and the updating of the table 400 can be performed in response to activation of these keys. The processing in response to activation of these keys would be performed in the same manner described above with respect to the "All On"/"All Off" procedures excepting that it would be performed on an individual device basis as illustrated in FIG. 8.

By way of specific example, assuming a Macro key was programmed to turn the VCR device on, turn the TV device on, and tune the TV device to channel 3, activation of the Macro key would result in the updating of the table 400 (in the manner described above) and the processing of the macro command steps as follows (assuming the table 400 indicates that the VCR and TV devices were setup and the addresses of their respective power monitor units were also setup):

For each of the VCR and TV devices:
  It is determined if the device supports explicit "On" and "Off" commands.
  If the device supports these explicit commands, the remote control 10 merely transmits the explicit "On" command for the device and the macro continues to the next step.
  If the device does not support explicit commands (i.e., it supports a power toggle command), the current status of the device is retrieved from the power status field 450 of the data table 400.
  If the status is indicated to be "Unknown" or "On," no further processing for the device is performed and the macro moves to the next step (if any).
  If, however, the status is indicated to be "Off," the power toggle command for the device is transmitted for the purpose of causing the device to enter the "On" state and the next step in the macro chain is executed (if any).

In this manner, the remote control 10 ensures that execution of a macro or the single power on key will not place an appliance in an undesired state.

Figure 13:
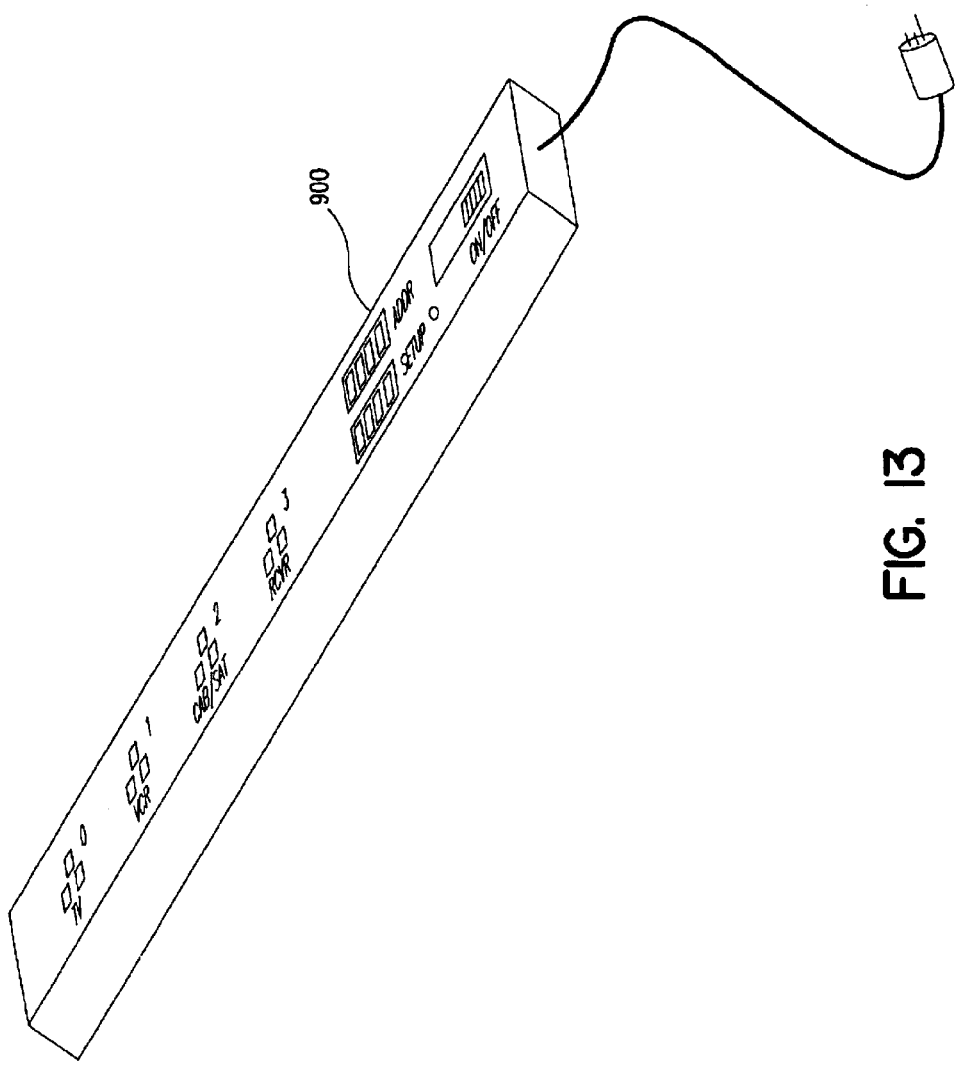
FIG. 13 illustrates a further power monitoring unit in the form of a power strip.
Figure 14:
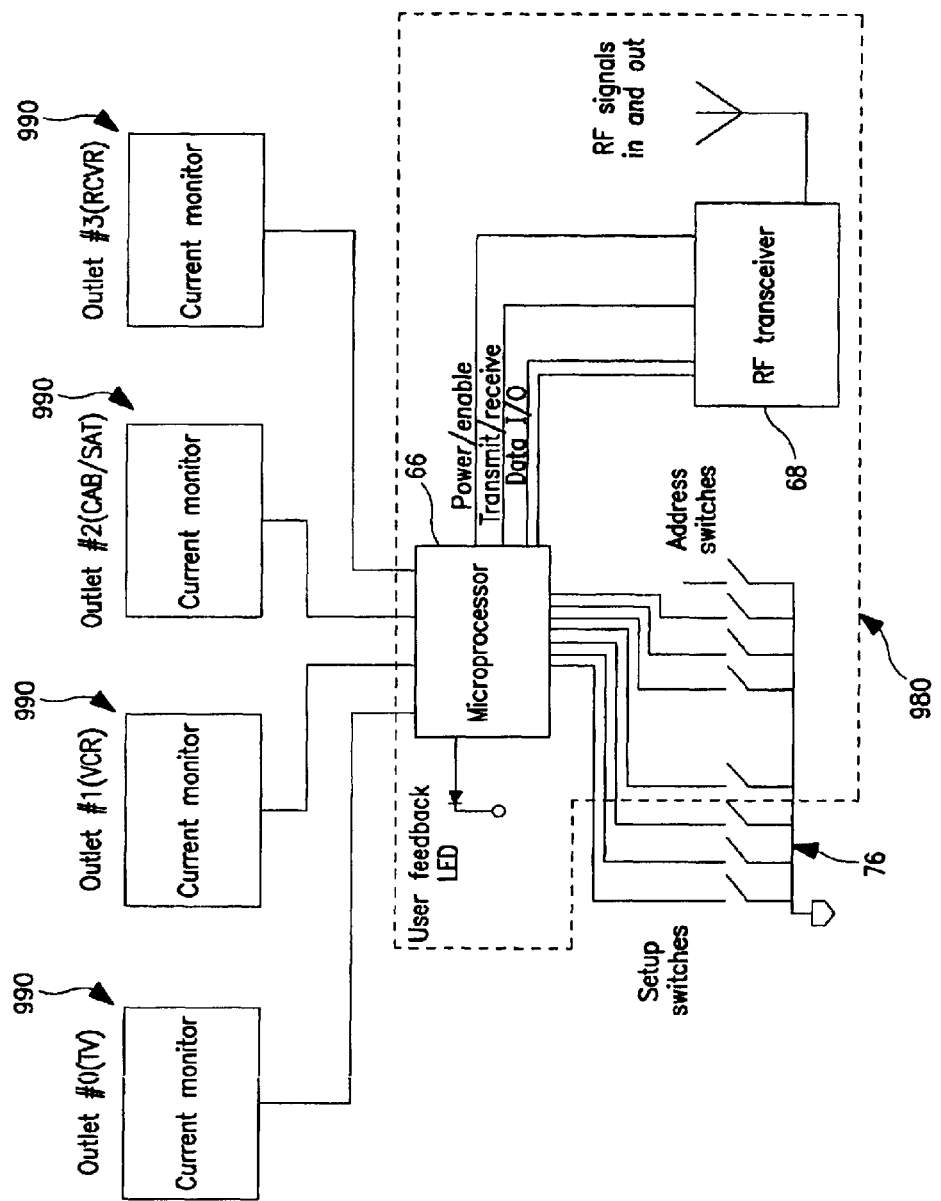
FIG. 14 illustrates a schematic diagram of the exemplary power monitoring unit of FIG. 13.

While specific embodiments of the present invention have been described in detail, it will be appreciated by those skilled in the art that various modifications and alternatives to those details could be developed in light of the overall teachings of the disclosure. For example, it is contemplated that several current monitor modules 990 may be combined with a single microprocessor and RF transceiver 980 into a smart power strip 900 for use in an entertainment center, as illustrated in FIGS. 13 and 14. In this case, the method of operation and the processing logic is essentially the same as described previously excepting that, in this case, upon receipt of a power status query from the remote control 10 the microprocessor 66 will poll each power outlet and transmit a corresponding number of sequential status reply messages to the remote control 10. Each power outlet in the strip 900 can be assigned a unique address by the user or the user can set one number for the power strip which causes the outlets to be automatically assigned sequential addresses starting with the user set number. This approach allows power strips 900 and individual monitor modules 14 to be intermixed transparently to the remote control logic. Still further, it will be appreciated that a single power monitor module 990 could be switched between multiple power outlets using triacs or similar power switching apparatus under control of the microprocessor 66. Accordingly, it will be understood that the particular arrangements and procedures disclosed are meant to be illustrative only and not limiting as to the scope of the invention which is to be given the full breadth of the appended claims and any equivalents thereof.

What is claimed is:

1. A method of using a remote control to command an appliance to enter into a desired power state, the method comprising:

accepting input into the remote control which defines a macro command sequence, the macro command sequence including a command for causing the appliance to enter into the desired power state;

receiving at the remote control from a power monitor associated with the appliance a current power state of the appliance;

comparing within the remote control the current power state to the desired power state; and when it is determined that the current power state is the desired power state, inhibiting the remote control from transmitting the command for causing the appliance to enter into the desired power state when the macro command sequence is executed by the remote control.

2. The method as recited in claim 1, wherein execution of the macro command sequence is initiated via activation of at least one key of the remote control.

3. The method as recited in claim 1, comprising transmitting a query message from the remote control to the power monitor to initiate retrieval of the current power state from the power monitor.

4. The method as recited in claim 1, wherein the remote control receives the current power state from the power monitor via a RF transmission.

5. The method as recited in claim 1, wherein the remote control transmits commands to the appliance via IR transmission.

6. The method as recited in claim 1, comprising accepting input into the remote control to associate the power monitor with the appliance.

7. The method as recited in claim 1, comprising storing within a memory of the remote control the current power state.

8. The method as recited in claim 1, comprising inhibiting the remote control from transmitting the command for causing the appliance to enter into the desired power state when the macro command sequence is executed by the remote control and when the current power state of the appliance is unknown to the remote control.

9. A readable media for use in a remote control having instructions to command an appliance to enter into a desired power state, the instructions performing steps comprising:

accepting input into the remote control which defines a macro command sequence, the macro command sequence including a command for causing the appliance to enter into the desired power state;

receiving at the remote control from a power monitor associated with the appliance a current power state of the appliance;

comparing within the remote control the current power state to the desired power state; and when it is determined that the current power state is the desired power state, inhibiting the remote control from transmitting the command for causing the appliance to enter into the desired power state when the macro command sequence is executed by the remote control.

10. The readable media as recited in claim 9, wherein execution of the macro command sequence is initiated via activation of at least one key of the remote control.

11. The readable media as recited in claim 9, wherein the instructions transmit a query message from the remote control to the power monitor to initiate retrieval of the current power state from the power monitor.

12. The readable media as recited in claim 9, wherein the remote control receives the current power state from the power monitor via a RF transmission.

13. The readable media as recited in claim 9, wherein the remote control transmits commands to the appliance via IR transmission.

14. The readable media as recited in claim 9, wherein the instructions accept input into the remote control to associate the power monitor with the appliance.

15. The readable media as recited in claim 9, wherein the instructions store within a memory of the remote control the current power state.

16. The readable media as recited in claim 9, wherein the instructions inhibit the remote control from transmitting the command for causing the appliance to enter into the desired power state when the macro command sequence is executed by the remote control and when the current power state of the appliance is unknown to the remote control.

17. A method of using a remote control to command an appliance to enter into a desired power state, the method comprising:

accepting input into the remote control which defines a macro command sequence, the macro command sequence including a command for causing the appliance to enter into the desired power state;

maintaining within a memory of the remote control data indicative of a current power state of the appliance;

comparing within the remote control the current power state to the desired power state; and when it is determined that the current power state is the desired power state, inhibiting the remote control from transmitting the command for causing the appliance to enter into the desired power state when the macro command sequence is executed by the remote control.

18. The method as recited in claim 17, wherein execution of the macro command sequence is initiated via activation of at least one key of the remote control.

19. The method as recited in claim 18, wherein the remote control transmits commands to the appliance via IR transmission.

20. The method as recited in claim 19, comprising inhibiting the remote control from transmitting the command for causing the appliance to enter into the desired power state when the macro command sequence is executed by the remote control and when the current power state of the appliance is unknown to the remote control.

21. A system for controlling the operation of an appliance, the system comprising:

a power monitor having a first wireless communication module associated with the appliance; and a remote control having a second wireless communication module for transmitting one or more commands to the appliance and a third wireless communication module for communicating with the first wireless communication module of the power module; wherein the remote control has programming for accepting input into the remote control which defines a macro command sequence, the macro command sequence including a command transmittable via the second wireless module for causing the appliance to enter into a desired power state; receiving at the remote control via the third wireless communication module from the first wireless communication module of the power monitor a current power state of the appliance; comparing within the remote control the current power state to the desired power state; and when it is determined that the current power state is the desired power state, inhibiting the remote control from transmitting via the second wireless communication module the command for causing the appliance to enter into the desired power state when the macro command sequence is executed by the remote control.

22. The system as recited in claim 21, wherein execution of the macro command sequence is initiated via activation of at least one key of the remote control.

23. The system as recited in claim 21, wherein the programming transmits a query message via the third wireless communication module from the remote control to the first wireless communication module of the power monitor to initiate retrieval of the current power state from the power monitor.

24. The system as recited in claim 21, wherein the first wireless communication module and the third wireless communication module are RF modules.

25. The system as recited in claim 21, wherein the second wireless communication module is an IR module.

26. The system as recited in claim 25 wherein the said second and third wireless communication modules comprise the same module.

27. The system as recited in claim 21, wherein the second wireless communication module is an RF module.

28. The system as recited in claim 21, wherein the programming accepts input into the remote control to associate the power monitor with the appliance.

29. The system as recited in claim 21, wherein the programming stores within a memory of the remote control the current power state.

30. The system as recited in claim 21, wherein the programming inhibits the remote control from transmitting the command for causing the appliance to enter into the desired power state via the second wireless communications module when the macro command sequence is executed by the remote control and when the current power state of the appliance is unknown to the remote control.

31. A method of using a remote control to command an appliance to enter into a desired power state, the method comprising:
    accepting input into the remote control which defines a macro command sequence, the macro command sequence including a command for causing the appliance to enter into the desired power state;
    maintaining within a memory of the remote control data indicative of a current power state of the appliance; and
    when the memory of the remote control fails to include data that functions to indicate the current power state of the appliance, inhibiting the remote control from transmitting the command for causing the appliance to enter into the desired power state when the macro command sequence is executed by the remote control.

32. For use in a remote control, a readable media having instructions for commanding an appliance to enter into a desired power state, the instructions performing steps comprising:
    accepting input into the remote control which defines a macro command sequence, the macro command sequence including a command for causing the appliance to enter into the desired power state;
    maintaining within a memory of the remote control data indicative of a current power state of the appliance; and
    when the memory of the remote control fails to include data that functions to indicate the current power state of the appliance, inhibiting the remote control from transmitting the command for causing the appliance to enter into the desired power state when the macro command sequence is executed by the remote control.

* * * * *